United States Patent [19]
Miyaki et al.

[11] 3,924,590
[45] Dec. 9, 1975

[54] INTAKE ARRANGEMENT OF AN INTERNAL COMBUSTION ENGINE

[75] Inventors: Kiyoshi Miyaki, Asaka; Hiroshi Kogure, Tokorozawa, both of Japan

[73] Assignee: Honda Giken Kogyo Kabushiki Kaisha, Tokyo, Japan

[22] Filed: June 22, 1973

[21] Appl. No.: 372,679

[30] Foreign Application Priority Data
June 30, 1972 Japan.............................. 47-77408

[52] U.S. Cl. ...... 123/122 AB; 123/32 SP; 123/75 B; 123/122 AC; 123/193 H
[51] Int. Cl.².................. F02M 31/00; F02B 75/02
[58] Field of Search...... 123/32 ST, 32 SA, 32 SP, 123/122 A, 122 AA, 122 AB, 122 C, 193 H, 123/191 S, 191 SP, 75 B, 122 AC

[56] References Cited
UNITED STATES PATENTS

| | | | |
|---|---|---|---|
| 2,011,992 | 8/1935 | Aseltine | 123/75 B |
| 2,184,357 | 12/1939 | Mallory | 123/191 SP |
| 2,884,913 | 5/1959 | Heintz | 123/32 ST |
| 3,092,088 | 6/1963 | Goossak et al. | 123/32 ST |
| 3,659,564 | 5/1972 | Suzuki et al. | 123/32 ST X |
| 3,832,984 | 9/1974 | Taguchi | 123/122 AC X |
| 3,844,259 | 10/1974 | Asaka | 123/32 ST X |
| 3,853,097 | 12/1974 | Kume | 123/75 B X |

FOREIGN PATENTS OR APPLICATIONS
223,913  12/1957  Australia.......................... 123/75 B

*Primary Examiner*—Charles J. Myhre
*Assistant Examiner*—Tony Argenbright
*Attorney, Agent, or Firm*—Lyon & Lyon

[57] ABSTRACT

An intake arrangement for internal combustion engines of the type having a main combustion chamber which receives a lean air-fuel mixture and an auxiliary combustion chamber which receives a rich air-fuel mixture and communicates with the main combustion chamber through a torch passage; the intake arrangement including a head structure having an exhaust passage and a main intake passage for the main chamber between which is located an auxiliary intake passage for the auxiliary chamber, the head structure being heat conductive so that heat from the exhaust passage vaporizes the rich air-fuel mixture in the auxiliary intake passage and excess heat is transferred to the lean air-fuel mixture in the main intake passage.

2 Claims, 3 Drawing Figures

INTAKE ARRANGEMENT OF AN INTERNAL COMBUSTION ENGINE

BACKGROUND AND SUMMARY OF THE INVENTION

Internal combustion engines having a main combustion chamber coupled through a torch passage to a small auxiliary chamber have been proposed in which the main chamber receives a lean air-fuel mixture, while the auxiliary chamber receives a rich air-fuel mixture. The present invention is directed to a novel arrangement wherein the intake passage for the auxiliary chamber is disposed between the exhaust and main intake passage in heat conductive arrangement wherein heat is transferred to the rich air-fuel mixture in the auxiliary intake passage in an amount to insure vaporization, while excess heat is passed on to the lean air-fuel mixture within the main intake passage.

Figure 1:
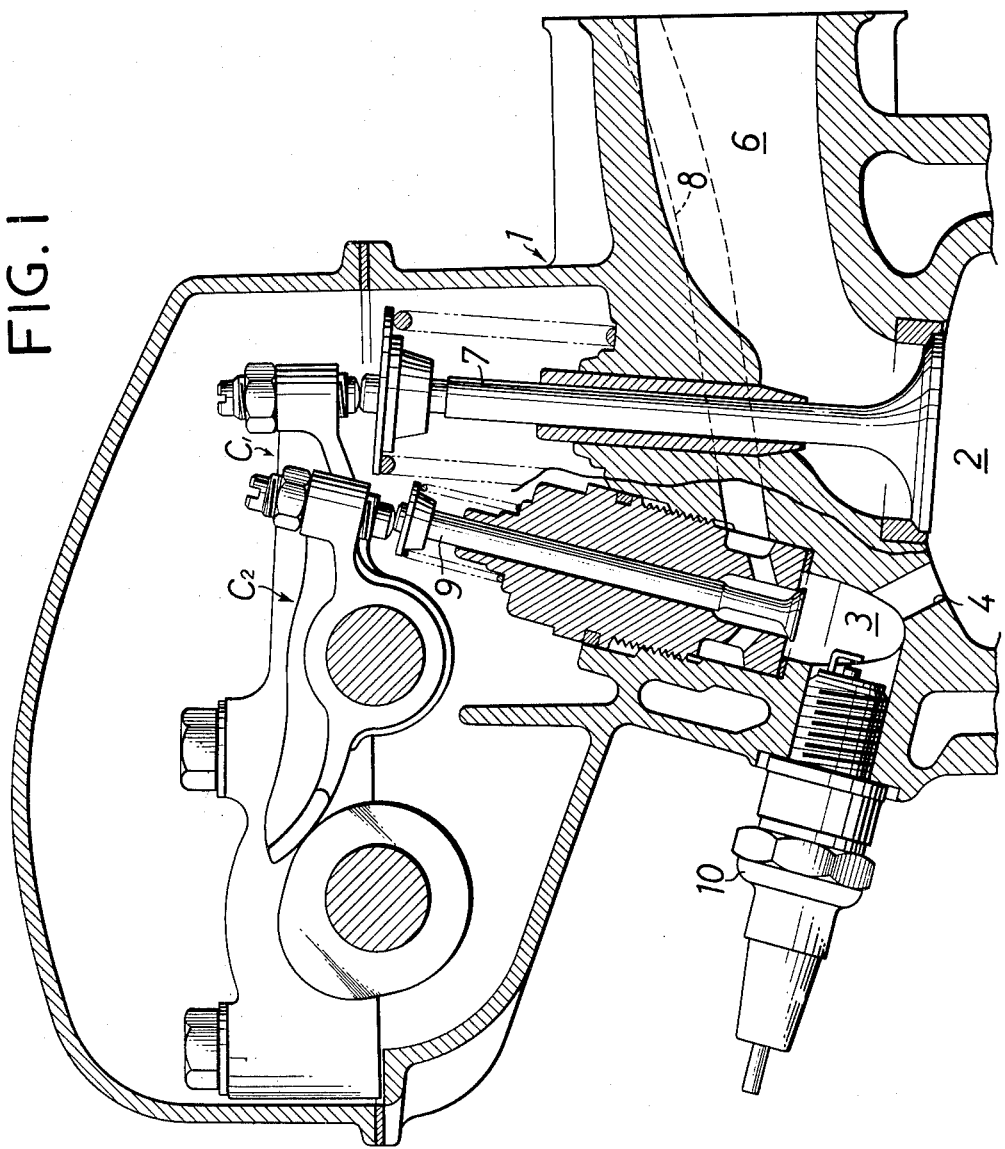
FIG. 1 is a fragmentary vertical cross sectional view of the head portion of an internal combustion engine embodying the present invention.
Figure 2:
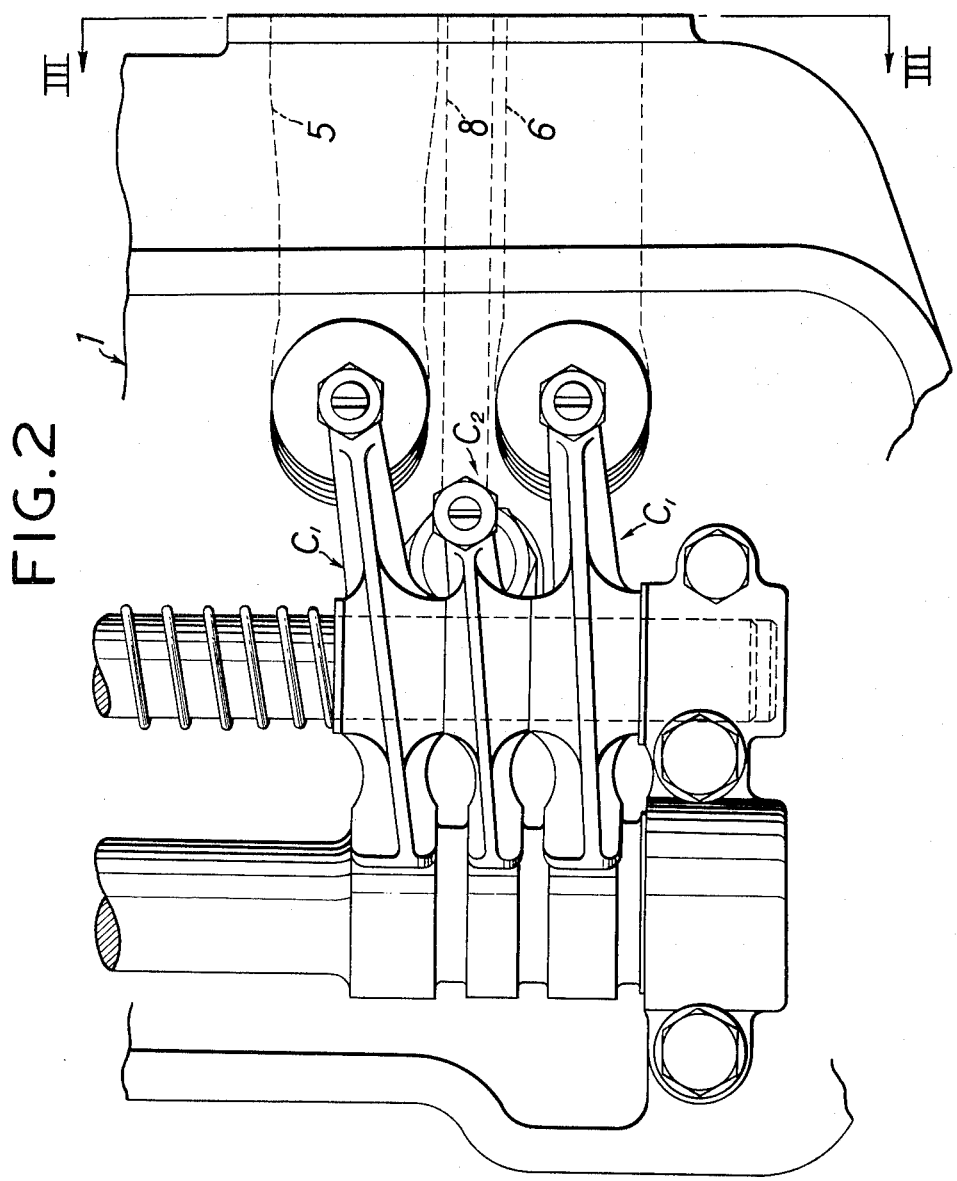
FIG. 2 is a fragmentary plan view thereof.
Figure 3:
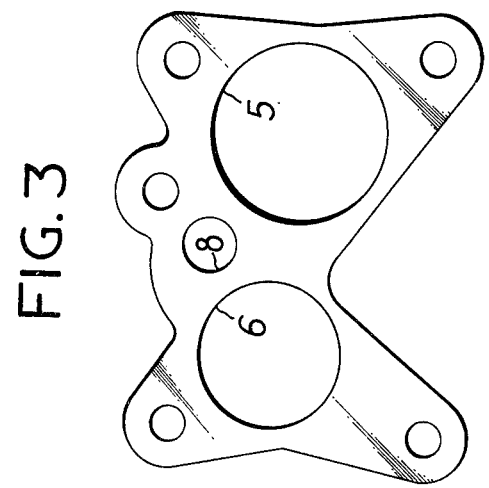
FIG. 3 is an end view taken along III — III of FIG. 2.

The intake arrangement for internal combustion engines includes a head portion 1 forming, in part, a main combustion chamber 2 communicating with a substantially smaller auxiliary combustion chamber 3 through a torch passage 4. A spark plug 10 is provided for the auxiliary chamber 3.

The main combustion chamber 2 is connected to a main intake passage 5 and an exhaust passage 6 located at the same side of the head portion 1 in essentially parallel relation. A main intake valve controls the main inlet passage 5. Similarly, an exhaust valve 7 controls the exhaust passage 6. The main inlet valve (not shown) and the exhaust valve are individually actuated by conventional valve operating mechanisms $C_1$.

The auxiliary combustion chamber is connected to a relatively small auxiliary intake passage 8 through which passes a rich air-fuel mixture. The auxiliary intake passage 8 is cast in the head portion 1 between the exhaust passage 6 and intake passage 5, and extends downward toward the auxiliary chamber 3. The head portion 1 includes a single casting forming the passages 5, 6 and 8 so that heat from the exhaust passage is carried to the auxiliary intake passage 8 and is effective to vaporize the rich air-fuel mixture therein. However, the presence of the main intake passage and the relatively large volume of lean air-fuel mixture therein serves to absorb excess heat without overheating the lean air-fuel mixture. Also the fact that the auxiliary intake passage is relatively small, the head portion provides substantial conductive regions around the auxiliary intake passage for transfer of excess heat to the contents of the main intake passage.

The auxiliary combustion chamber 3 is provided with an auxiliary inlet valve 9 mounted in a screwthreaded sleeve having channels communicating between the auxiliary intake passage 8 and the auxiliary combustion chamber when the valve 9 is open. A conventional valve operating mechanism $C_2$ controls the valve 9.

Operation of the intake arrangement for internal combustion engines is as follows:

Heat from the exhaust passage 6 is transferred through the head portion 1 to the rich air-fuel mixture to the extent that the fuel is fully vaporized. Excess heating is prevented as it is conducted around the auxiliary intake passage 8 to the lean air-fuel mixture in passage 5. The capacity of the main intake passage 5 is substantially larger than the auxiliary intake passage 8, and thus tends to maintain a uniform condition through a range of engine speeds.

Having fully described our invention, it is to be understood that we are not to be limited to the details herein set forth, but that our invention is of the full scope of the appended claims.

We claim:

1. In an internal combustion engine, the combination of a main combustion chamber for a lean air-fuel mixture and a smaller auxiliary combustion chamber for a rich air-fuel mixture, the chambers being connected by a torch passage, the main combustion chamber being provided with an exhaust valve and a main inlet valve and the auxiliary combustion chamber being provided with an inlet valve, a cast body having an elongated exhaust passage formed therein and controlled by the exhaust valve, said cast body also having an elongated main intake passage formed therein for a lean air-fuel mixture controlled by the main inlet valve, said exhaust and main intake passages being substantially parallel, an elongated auxiliary intake passage formed in said cast body and positioned between said other passages and extending downward at an angle with respect to them toward said auxiliary chamber, all three passages being disposed in heat conductive relation whereby the rich air-fuel mixture is heated to a greater extent than the lean air-fuel mixture.

2. The combination as defined in claim 1, wherein: the auxiliary intake passage is substantially smaller than the exhaust passage and the main intake passage, and wherein heat conductive elements are provided exteriorly of the auxiliary intake passage for conducting heat to the contents of the main intake passage.

* * * * *